(12) United States Patent
Smith (10) Patent No.: US 10,289,874 B2
(45) Date of Patent: May 14, 2019

(54) STACK EDGE IMAGE FORMATION (75) Inventor: Greg S Smith, Oceanside, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1074 days.

(21) Appl. No.: 12/721,341

(22) Filed: Mar. 10, 2010

(65) Prior Publication Data

US 2011/0221846 A1  Sep. 15, 2011

(51) Int. Cl.
*B41J 2/01* (2006.01)
*G06F 17/00* (2006.01)
*G06K 1/12* (2006.01)
*G06K 7/14* (2006.01)
*B41F 17/02* (2006.01)

(52) U.S. Cl.
CPC .............. *G06K 1/121* (2013.01); *B41F 17/02* (2013.01); *G06K 7/1417* (2013.01)

(58) Field of Classification Search
CPC ........ G06K 7/1417; G06K 1/121; B41F 17/02
See application file for complete search history.

(56) References Cited

U.S. PATENT DOCUMENTS

| 1,866,968 | A | * | 7/1932 | Ellison | B42F 21/00 283/40 |
|---|---|---|---|---|---|
| 5,085,417 | A | * | 2/1992 | Copham | 270/1.02 |
| 5,417,159 | A | | 5/1995 | Mains, Sr. | |
| 6,478,337 | B1 | * | 11/2002 | Toda et al. | 283/38 |
| 7,267,498 | B2 | * | 9/2007 | Cahill et al. | 400/62 |
| 2004/0121076 | A1 | * | 6/2004 | Haines | 427/284 |
| 2009/0039583 | A1 | | 2/2009 | Horn et al. | |
| 2009/0073498 | A1 | | 3/2009 | Markwardt | |

* cited by examiner

*Primary Examiner* — John Zimmermann
(74) *Attorney, Agent, or Firm* — HP Inc. Patent Department (57) ABSTRACT

An image forming method comprises stretching a pixel row to a height greater than that of the pixel row to generate a barcode image. The barcode image is formed on a face of a media page at an edge such that the imaging material forming the barcode image forms the pixel row on the edge of the media sheet.

20 Claims, 6 Drawing Sheets

STACK EDGE IMAGE FORMATION

BACKGROUND

After producing printed images on media pages, those pages can be assembled into a stack. Such media page stacks may form books, memo pads, or even a collection of photos. Printed images formed on an edge of the stack can serve a number of purposes. An edge image selected from a collection of photos may be aesthetic. Another edge image, such as barcodes, may be used to convey information. Forming edge images on a stack often involves a process different than that used to form images on the media pages themselves, and thus introduces an additional cost for producing the stack of media pages.

DETAILED DESCRIPTION

Introduction:

Various embodiments described below were developed to produce an edge image on a stack of media pages utilizing the same process used to form images on the media pages themselves. As described in more detail below, a pixel row taken from an edge image is stretched to generate a barcode image. That barcode image is formed on the face of a media sheet at an edge such that the imaging material forming the barcode image overlaps the edge of the media sheet. That overlapping portion forms the pixel row on that edge. The process can be repeated for each pixel row of the edge image. When the media images are assembled into a stack, the edge image appears on a side of the stack. In this fashion, images can be formed on the media pages and their edges simultaneously.

The following description is broken into sections. The first, labeled "Environment," describes an exemplary environment in which various embodiments may be implemented. The second section, labeled "Edge Image," describes an example of forming an edge image on a stack of media pages. The third section, labeled "Components," describes examples of various physical and logical components for implementing various embodiments. The fourth section, labeled as "Operation," describes steps taken to implement various embodiments.

Figure 1:
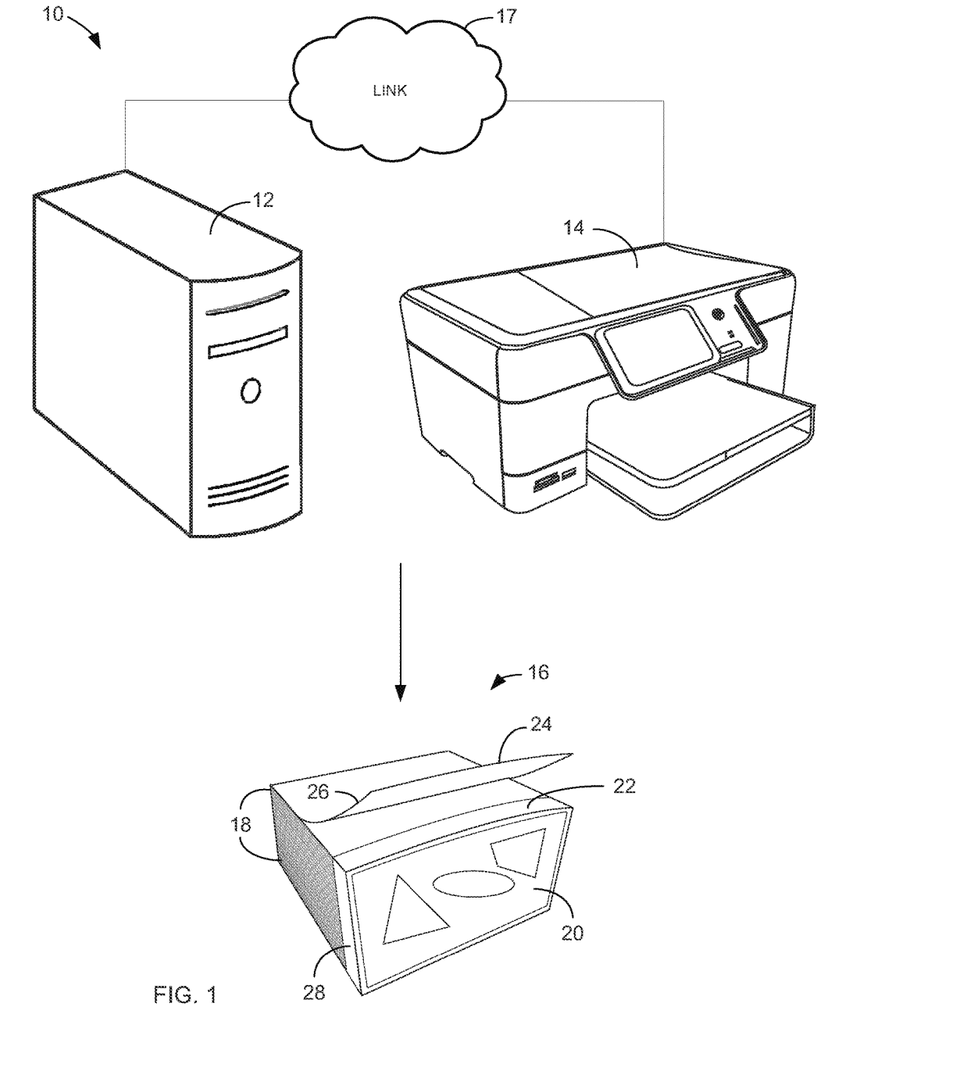
FIG. 1 depicts an exemplary environment in which various embodiments may be implemented.

Environment:

FIG. 1 depicts an exemplary environment 10 in which various embodiments may be implemented. Environment 10 is shown to computer 12, printer 14, and stack 16. Computer 12 represents generally any computing device capable of communicating with and causing printer 14 to produce images on media pages. Printer 14 represents generally any printing device capable of producing images on media pages. In particular, printer 14 is capable of producing "borderless" images. Such borderless images may be produced by printing up to and perhaps just beyond an edge of a media page. Borderless images may also be produced by cutting or trimming borders from the media page such that an image formed on the media page extends to the trimmed edge.

In the example of FIG. 10, printer 14 and computer 12 are interconnected by link 17. Link 17 represents generally one or more of a cable, wireless, fiber optic, or remote connections via a telecommunication link, an infrared link, a radio frequency link, or any other connectors or systems that provide electronic communication. Link 17 may include, at least in part, an intranet, the Internet, or a combination of both. Link 17 may also include intermediate proxies, routers, switches, load balancers, and the like. In an exemplary embodiment, computer 12 and printer 14 are integrated in a single device. In this case, link 17 represents internal connections within that device.

Stack 16 represents a stack of media pages 18. An exemplary edge image 20 is formed on one edge image of stack 16. That edge is made up of edges 24 of media pages 18. To produce edge image 20—for each media page 18, barcode image 22 is generated by stretching a different pixel row segmented from edge image 20. The generated barcode image 22 is formed on a face of that media sheet 18 at edge 24 such that the imaging material used to form barcode image 22 overlaps edge 24 and forms that pixel row. Once completed for each media page 18, stacked edges 24 combine to form edge image 20. Media pages 18 include other edges such as edge 26. The barcode image formed on media pages 18 may abut edges 24 and 26. Thus, not only causing edge image for be formed on stack 16, but also side barcode image 28.

Edge Image:

FIGS. 2-5 depict an exemplary edge image and the forming of that edge image on a stack of media pages according to embodiments. An edge image is a digital image selected to appear on an edge of a stack of media pages. In general a digital image is made up of a grid of pixels. That grid is assembled from a sequence of pixel rows. A pixel row is a segment of the digital image made up of a line of pixels.

Figure 2:
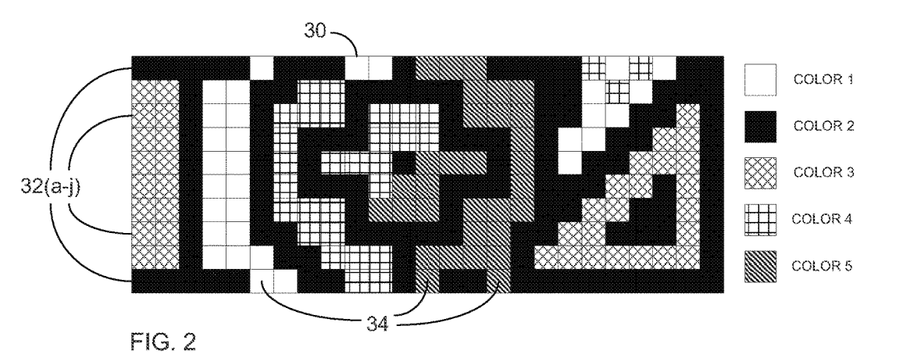
FIG. 2 depicts an exemplary edge image.

Starting with FIG. 2, edge image 30, in this example, is made up of a sequence of pixel rows 32(a) through 32(j). Each pixel row includes a sequence of pixels 34. While edge image is shown to include ten pixel rows each containing twenty-five pixels 34, the particular quantities here were chosen for ease of illustration. Edge image 30 may have any number of pixel rows containing any number of pixels. It is expected that edge image 30 will include a pixel row for each media page to be included in a stack. The number of pixels in the pixel rows, then, corresponds to a width the edge image is to span on an edge of the stack.

Figure 3:
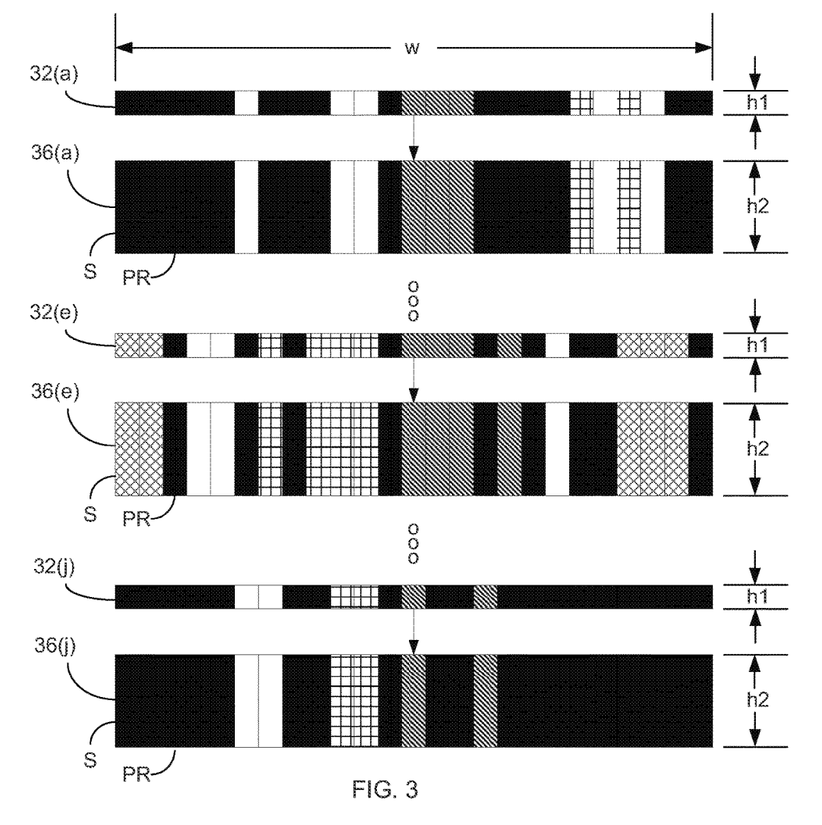
FIG. 3 depicts various pixel rows from the edge image of FIG. 2 being stretched to generate corresponding barcode images according to an embodiment.

In FIG. 3, each pixel row 32(a)-32(j) has been segmented from edge image 30. Note that, for ease of illustration, only pixel rows 32(a), 32(e), and 32(j) are shown. Each pixel row 32(a)-32(j) is stretched in one dimension to generate a corresponding barcode image 36(a)-36(j). As shown each pixel row is shown to have a height dimension (h1) corresponding to the height of a pixel. Pixel rows are stretched by in increasing that height (h1) to a second greater height (h2). Note that the width (w) of each pixel row 32(a)-32(j) is the same as the width (w) of each corresponding barcode image 36(a)-36(j). For later discussion, also note that each barcode image has a pixel row edge (PR) and a side edge (S). The resulting image appears as a barcode made of columns each corresponding to a different pixel from a corresponding pixel row. That barcode, may, but need not encode other information.

Figure 4A:
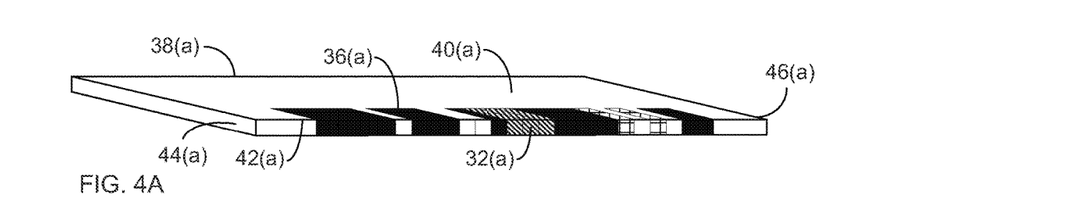
FIGS. 4A-4C depict a barcode image of FIG. 3 being formed on media pages according to various embodiments.
Figure 4B:
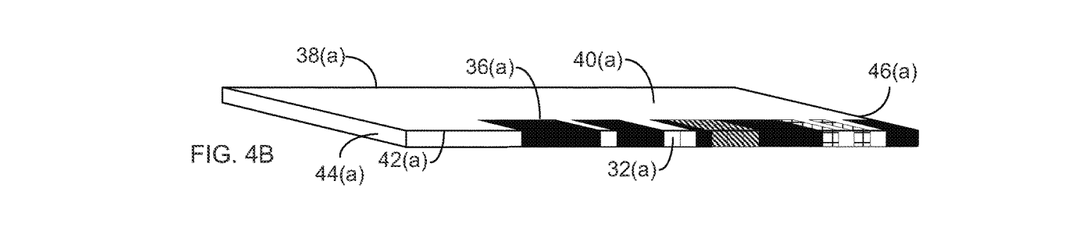
Figure 4C:
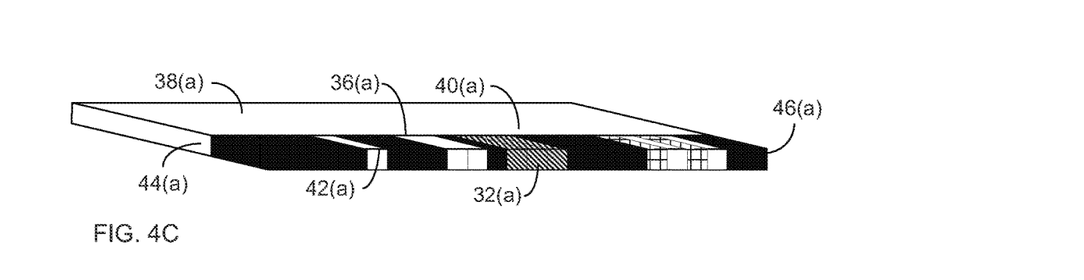

FIGS. 4A-4C depict examples of forming a barcode image on a media page. In these examples, barcode image 36(a) is formed on media page 38(a). Media page 38(a) includes face 40(a) and edges 42(a), 44(a), and 46(a). Edges 44(a) and 46(a) oppose one another and are adjacent to edge 42(a). Note that an edge opposing edge 42(a) exists but is not discussed. In FIGS. 4A-4C barcode image 36(a) is formed on face 40(a) such that its pixel row edge overlaps edge 42(a). That overlap forms pixel row 32(a) on edge 42(a). This overlap can be caused by using a printer in a "borderless" mode to print on face 40(a) right up to and perhaps just over edge 42(a). In doing so, some of the imaging material used to form barcode image 36(a) overlaps edge 42(a). The overlapping imaging material forms corresponding pixel row 32(a). To achieve the borderless mode in another implementation, the media page, after the barcode image is formed, may be trimmed such that the pixel row edge of the barcode image overlaps the trimmed edge of the media page.

In FIGS. 4A-4C, barcode image 36(a) is positioned differently on media page 38(a). In FIG. 4A, barcode image 36(a) is generally centered and does not reach to edges 44(a) or 46(a). In FIG. 4B, barcode image 36(a) is positioned such that one side edge abuts edge 46(a) but not edge 44(a). In FIG. 4C, barcode image 36(a) is positioned such that its opposing side edges abut opposing edges 44(a) and 46(a). When abutting edges 44(a) and/or 46(a), a portion of the imaging material used to form barcode image 36(a) overlaps that edge as well.

Figure 5A:
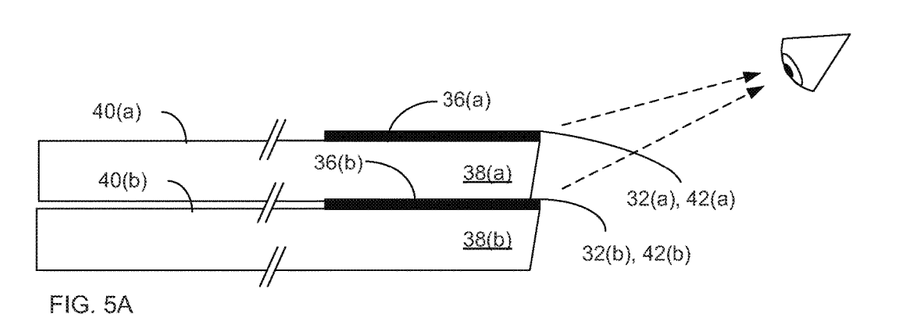
FIGS. 5A-5C depict non orthogonal and non-linear media page edge transitions according to embodiments.
Figure 5B:
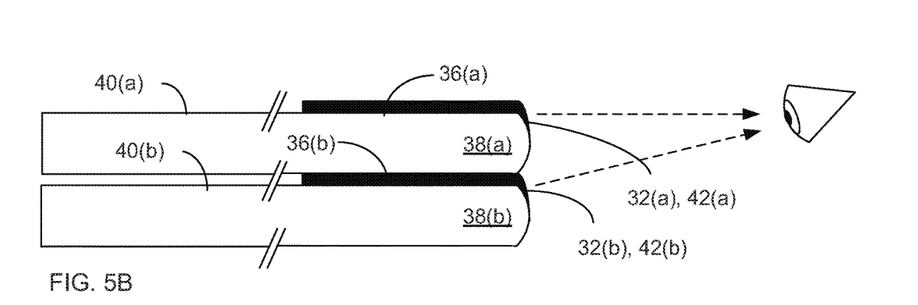
Figure 5C:
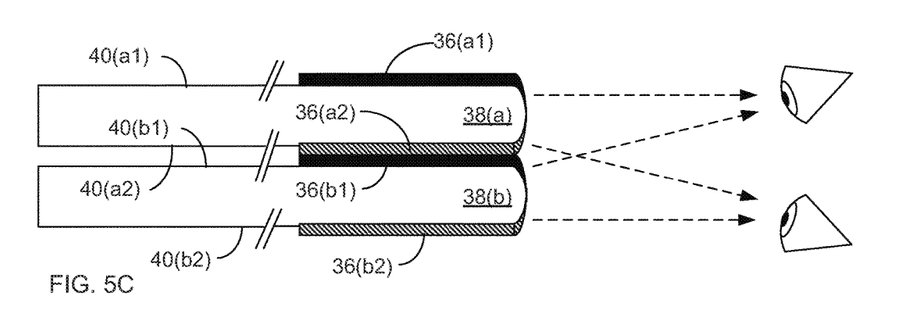

The term edge is used, above and in the following, to define the transition between opposing faces of a media page. In FIGS. 4(A)-4(C), that transition is depicted as defining a linear surface orthogonal to the opposing faces. At a macro level, such may appear to be the case. In reality, the transition need not be linear or orthogonal. In fact, such edge variations can improve visibility of imaging material on a media page edge when that page is part of a stack. FIGS. 5A-5B help illustrate.

FIG. 5A depicts a stack containing media pages 38(a) and 38(b). Barcode images 36(a) and 36(b) have been formed on faces 40(a) and 40(b). The transition defined by edges 42(a) and 42(b) are not orthogonal to faces 40(a) and 40(b). Thus, a portion of barcode image 36(b) formed on face 40(b) overlapping edge 42(b) remains visible. That portion appears as the pixel row used to generate barcode image. Such non-linear transitions may be caused by trimming media pages.

FIG. 5B depicts a stack containing media pages 38(a) and 38(b) where the transitions defined by edges 42(a) and 42(b) are not linear, and in this case are bowed outward. Thus as barcode images 36(a) and 36(b) are formed on faces 40(a) and 40(b), imaging material is deposited on edges 42(a) and 42(b). The deposited imaging material on edges 42(a) and 42(b) appears to a viewer as the pixel rows from which barcode images 36(a) and 36(b) were generated. It is noted that in a duplex mode, barcode images may be formed on opposing faces of a media page. Looking at FIG. 5C, the particular pixel row visible to a viewer can depend on which angle the viewer observes the stack. Thus, different edge images formed by those pixel rows can appear on a stack edge depending on the view angle.

Figure 6:
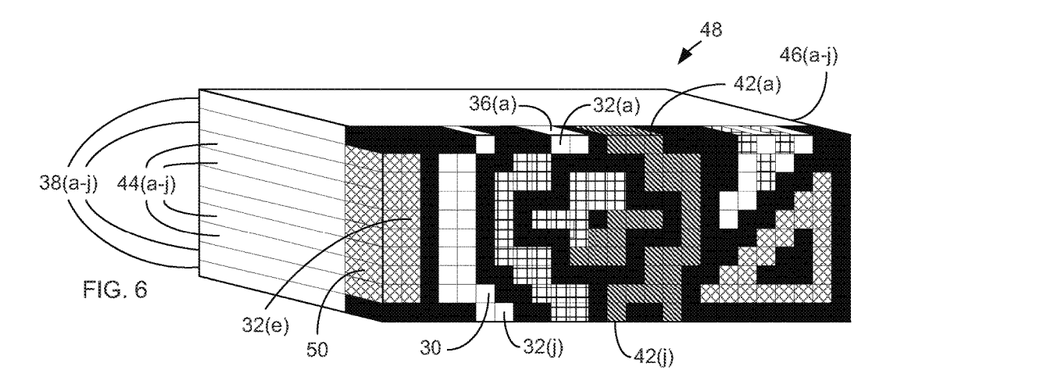
FIG. 6 depicts a stack formed according to an embodiment.

FIG. 6 depicts stack 48 assembled from media pages 38(a)-38(j)—each media page corresponds to a particular one of pixel rows 32(a)-32(j). Pixel rows 32(a)-32(j) appear on edges 44(a)-44(j) and combine to form edge image 30. In the example of FIG. 6, barcode image 36(a) extends the length of the media sheet edge that it abuts. As a result, imaging material used to form barcode image 32(a) overlaps edges 44(a) and 46(a). When media pages are assembled into stack 48, side barcode images 50 appears one edge and another side barcode image (not seen) appears on an opposing edge of stack 48. Those opposing edges adjacent to the edge on which edge image 30 appears.

Figure 7:
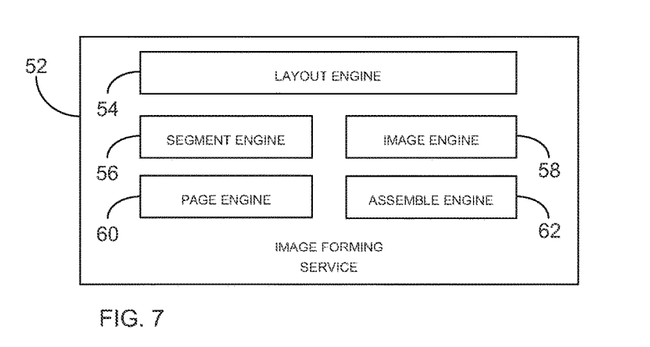
FIG. 7 depicts various physical and logical components of an embodiment.

Components:

FIG. 7 depicts an example of the physical and logical configured to implement various embodiments. In FIG. 7, the components are embodied in image forming service 52. Service 52 is shown to include layout engine 54, segment engine 56, image engine 58, page engine 60, and assemble engine 62. Layout engine 54 represents generally any combination of hardware and programming configured to select an edge image. An edge image is selected such that its dimensions correspond to the dimensions of the edge of a stack of media pages. Thus, layout engine 54 may clip edge image from a larger digital image. As noted, an edge image is made up from a sequence of pixel rows. Layout engine 54 may select edge image such that it includes a pixel row for each media page to be included in the stack. The width dimension of the edge image may be selected to be equal to or less than the width of that stack edge.

Segment engine 56 represents generally any combination of hardware and programming configured to segment an edge image into pixel rows. Each segmented pixel row corresponds to a given media page to be included in a stack. Image engine 58 represents generally any combination of hardware and programming configured to generate barcode images from each pixel row segmented from the edge image. In generating a barcode image, image engine 58 stretches a given pixel row to a height greater than that of the pixel row.

Page engine 60 represents generally any combination of hardware and programming configured to cause each barcode image to be formed on a face of a corresponding media page at an edge such that the imaging material forming the barcode image on the face covers the edge to form the pixel row on the edge of the media sheet. In a given implementation, page engine 60 causes a printer to operate in a borderless mode such that the printer deposits imaging to form images up to and perhaps slightly overlapping the edge or edges of the media sheet. To achieve the borderless mode in another implementation, page engine 60 may cause the media page, after the barcode image is formed, to be trimmed such that the pixel row edge of the barcode image overlaps the trimmed edge of the media page.

Each barcode image has a height dimension and a width dimension. The width dimension corresponds to a width dimension of the pixel row from which it was generated. Page engine 60 causes each barcode image to be formed such that the width dimension is parallel to and the barcode image abuts the edge of the media page. Page engine 60 may also cause each barcode image to be formed such the height dimension is parallel to and the barcode image abuts a second edge and perhaps even a third edge of the media page. Note that the second and third edges are adjacent to the edge on which the pixel row appears.

Assemble engine 62 represents generally any combination of hardware and programming configured to cause the media pages on which the barcode images have been formed to be assembled to form a stack. The stack is formed such that the pixel row corresponding to each media page appears on the edge of that media page and, as a result, the edge image appears on an edge of the stack. In one implementation, the stack is formed as each media page is fed by a printer sequentially into an output bin eventually forming the stack. Here, the stack may be a stack of photos. In another implementation, the stack may be formed by binding the media pages to form a book, memo pad, or other product.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media. While components 54-62 are shown together in FIG. 7, the components may be distributed across two or more devices. With reference to FIG. 1, some components 54-62 may be may be present on computer 12 while the remaining components 54-62 are present on printer 14.

Figure 8:
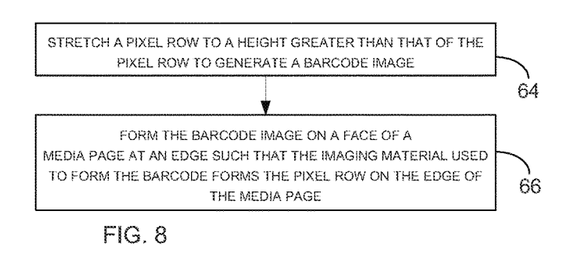
FIGS. 8 and 9 are flow diagrams depicting steps taken to implement various embodiments.
Figure 9:
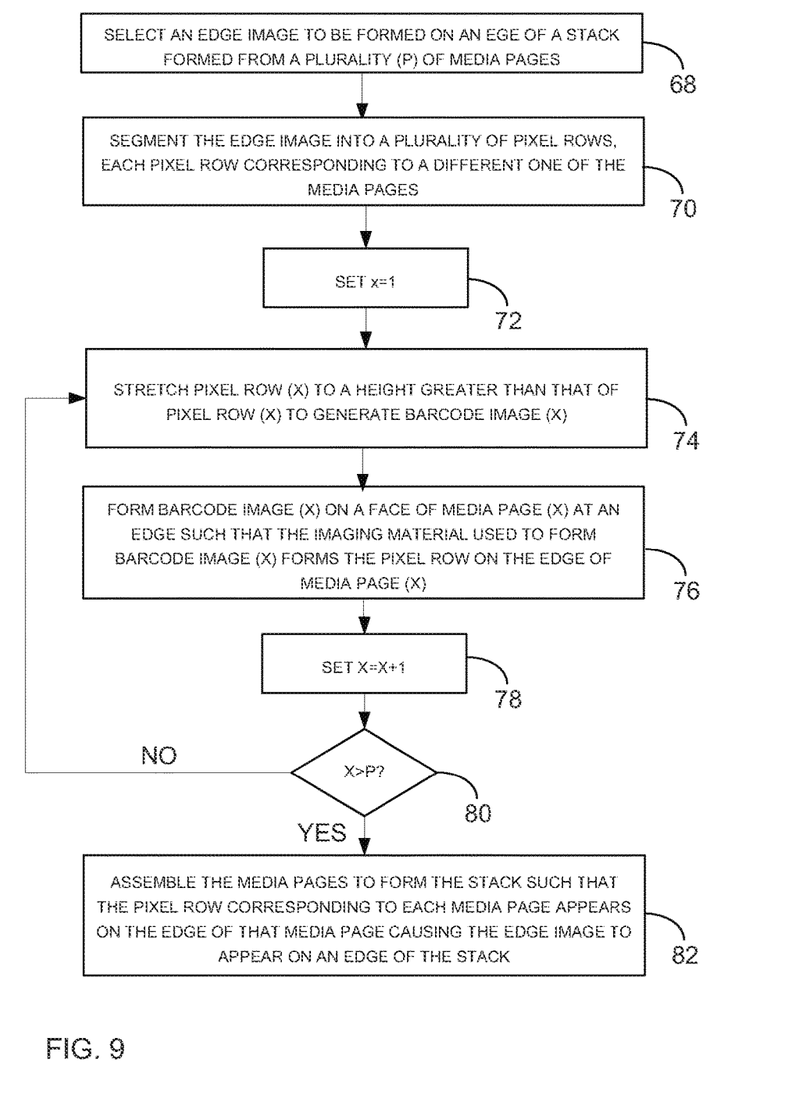

Operation:

FIGS. 8-9 depict exemplary flow diagrams of steps taken to implement various embodiments. FIG. 8 depicts taken to with respect to a given media page, while FIG. 8 depicts steps taken to create a stack from a plurality of such media pages. To provide context, without limitation, reference may be made to the various components of FIG. 7 when discussing FIGS. 8-9. It is to be understood that the methods of FIGS. 8-9 may be implemented using components other than those of FIG. 7.

Starting with FIG. 8, a pixel row is stretched to a height greater that of the pixel row to generate a barcode image (step 64). Referring to FIG. 7, image engine 58 is responsible for implementing step 64. Looking at FIGS. 2-6, image engine 58 takes a given pixel row 32(a)-32(j) and generates a corresponding barcode image 36(a)-36(j) by increasing the height (h1) of that pixel row 32(a)-32(j) to a greater height (h2). The resulting image contains a series of bars each corresponding to a pixel from the stretched pixel row.

The barcode image generated in step 64 is formed on a media page such that the imaging material forming the barcode image on the face covers an edge to form the pixel row on the edge of the media page (step 66). Referring to FIG. 7, page engine 60 is responsible for implementing step 66. Looking at FIGS. 4A-4C, page engine 66 causes the barcode image 36(a) to be formed on corresponding media page 38(a) at edge 42(a). Barcode image 36(a) is formed such that it overlaps edge 42(a) causing pixel row 32(a) to appear on edge 42(a).

Moving to FIG. 9, an edge image is selected (Step 68). The selected edge image is an image that is to appear on an edge of a stack of media pages. Referring to FIG. 7, layout engine 54 is responsible for step 68. In selecting the edge image, layout engine 54 may clip a portion from a larger image. The clipped portion may be made up of a pixel row for each of a plurality of media pages to be included in a stack. The clipped portion may have a width dimension equal to or less than the width of the stack edge on which it is to appear. Looking at FIGS. 2 and 6, edge image 30 includes pixel rows 32(a)-32(j), one for each media page 38(a)-38(j) in stack 48. In this example, the width of edge image 30 equal the width of the edge of stack 48 on which it appears.

The edge image is segmented into plurality (P) of sequential pixel rows where each pixel row corresponds to a different one of the media pages (Step 70). Referring to FIG. 7, segment engine 56 is responsible for implementing step 70. Looking at FIGS. 2 and 3, segment engine 56 has segmented edge image 30 into pixel rows 38(a)-38(j).

A variable (X) is set to a value of one (Step 72). Pixel row (X) is stretched to a height greater that of the pixel row to generate barcode image (X) (step 74). Referring to FIG. 7, image engine 58 is responsible for implementing step 64. Looking at FIGS. 2-5, image engine 58 takes a given pixel row 32(a)-32(j) and generates a corresponding barcode image 36(a)-36(j) by increasing the height (h1) of that pixel row 32(a)-32(j) to a greater height (h2). The resulting image contains a series of bars each corresponding to a pixel from the stretched pixel row.

The barcode image (X) generated in step 74 is formed on media page (X) such that the imaging material forming barcode image (X) covers an edge to form the pixel row on the edge of the media page (step 76). Referring to FIG. 7, page engine 60 is responsible for implementing step 66. Looking at FIGS. 4A-4C, page engine 66 causes the barcode image 36(a) to be formed on corresponding media page 38(a) at edge 42(a). Barcode image 36(a) is formed such that it overlaps edge 42(a) causing pixel row 32(a) to appear on edge 42(a). Looking at FIGS. 4A-4C, barcode image 36(a) may be selectively positioned along an edge 42(a). It may extend less than or the entire width of edge 42(a). Thus, looking at FIG. 6, resulting stack 48 may include side barcode image 50.

The variable (X) is increased by a value of one (step 78) and it is determined if (X) is greater than (P) (step 74). Steps 74-78 repeat until it is determined that (X) exceeds (P). When (X) exceeds (P) a barcode image will have been formed on each corresponding media page. These media pages are assembled to form a stack (step 82). For each media page in the stack, the pixel row corresponding to that media page appears on the page's edge causing the edge image to appear on an edge of the stack. Referring to FIG. 7, assemble image is responsible for implementing step 82. Looking at FIG. 6, media pages 38(a)-38(j) have been assembled to form stack 48 with edge image 30 appearing on an edge.

Conclusion:

FIG. 1 depicts an exemplary environment in which embodiments may be implemented to produce an edge image on a stack of media pages such as depicted in the examples of FIGS. 2-6. Implementation is not limited to the environment of FIG. 1 or the edge image and stack of FIGS. 2-6. FIG. 7 shows the architecture, functionality, and operation of a particular embodiment. Various components illustrated in FIG. 7 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 8-9 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method comprising:
   segmenting, by a system comprising a processor, a digital image into a plurality of pixel rows, each pixel row of the plurality of pixel rows including plural pixels;
   prior to printing the digital image, generating, by the system, a first barcode image by stretching a first pixel row of the plurality of pixel rows from a first height to a second height greater than the first height; and
   after the generating, causing, by the system, printing of the digital image, the printing comprising depositing imaging material forming the generated first barcode image on a face of a media page at an edge such that the imaging material forming the generated first barcode image forms the first pixel row on the edge of the media page.

2. The method of claim 1, wherein each pixel row of the plurality of pixel rows corresponds to a respective media page of a plurality of media pages to be included in a stack, the method further comprising:
   prior to printing the digital image, generating, by the system, a second barcode image by stretching a second pixel row of the plurality of pixel rows from the first height to the second height,
   wherein causing the printing of the digital image comprises depositing imaging material forming the generated second barcode image on a face of a second media page at an edge such that the imaging material forming the generated second barcode image forms the second pixel row on the edge of the second media page.

3. The method of claim 2, further comprising assembling the plurality of media pages to form the stack such that the pixel row corresponding to each respective media page appears on the edge of the respective media page causing the digital image to appear on a side of the stack, wherein a pattern of the plural pixels of the first pixel row is different from a pattern of the plural pixels of the second pixel row.

4. The method of claim 2, wherein each barcode image of the first and second barcode images has a width dimension equal to a width dimension of the digital image.

5. The method of claim 1, wherein the edge is a first edge of the media page,
   wherein a width dimension of the first barcode image is parallel to the first edge, and the first barcode image abuts the first edge, and
   wherein a height dimension of the first barcode image is parallel to a second edge of the media sheet, and the first barcode image abuts the second edge, the second edge being adjacent to the first edge.

6. The method of claim 1, wherein the edge is a first edge of the media page, wherein a width dimension of the first barcode image is parallel to the first edge, and the first barcode image abuts the first edge, and
   wherein a height dimension of the first barcode image is parallel to a second edge and a third edge of the media page, and the first barcode image abuts the second edge and the third edge, the second and third edges being adjacent to the first edge.

7. The method of claim 1:
   wherein each respective pixel row of the plurality of pixel rows corresponds to a respective media page of a plurality of media pages to be included in a stack;
   wherein for each respective pixel row and respective media page:
      the respective pixel row is formed on a first edge of the respective media page;
      the respective pixel row is stretched to generate a respective barcode image having a pixel row edge and opposing side edges adjacent to the pixel row edge, the pixel row edge having a width dimension equal to a width dimension of the digital image and equal to a width dimension of the first edge of the respective media page; and
      the respective barcode image is formed on a face of the respective media page such that the pixel row edge of the respective barcode image overlaps the first edge of the respective media page and the side edges of the respective barcode image overlap second and third edges of the respective media page adjacent to the first edge;
   the method further comprising assembling the plurality of media pages to form the stack such that the barcode images combine to form the digital image on a first side of the stack and the side edges of the barcode images combine to form side barcode images on second and third sides of the stack.

8. A non-transitory computer readable medium storing instructions that when executed cause a system to:
   segment a digital image into a plurality of pixel rows, each pixel row of the plurality of pixel rows including plural pixels;
   prior to printing the digital image, generate a first barcode image by stretching a first pixel row of the plurality of pixel rows from a first height to a second height greater than the first height; and
   after the generating, cause printing of the digital image, the printing comprising depositing imaging material forming the generated first barcode image on a face of a media page at an edge such that the imaging material forming the generated first barcode image forms the first pixel row on the edge of the media page.

9. The non-transitory computer readable medium of claim 8, wherein each pixel row of the plurality of pixel rows corresponds to a respective media page of a plurality of media pages to be included in a stack, and the instructions when executed cause the system:

prior to printing the digital image, generate a second barcode image by stretching a second pixel row of the plurality of pixel rows from the first height to the second height, wherein causing the printing of the digital image comprises depositing imaging material forming the generated second barcode image on a face of a second media page at an edge such that the imaging material forming the generated second barcode image forms the second pixel row on the edge of the second media page.

10. The non-transitory computer readable medium of claim 9, wherein each barcode image of the first and second barcode images has a width dimension equal to a width dimension of the digital image.

11. The non-transitory computer readable medium of claim 8, wherein the edge is a first edge of the media page,
wherein a width dimension of the first barcode image is parallel to the first edge, and the first barcode image abuts the first edge, and
wherein a height dimension of the first barcode image is parallel to a second edge of the media sheet, and the first barcode image abuts the second edge, the second edge being adjacent to the first edge.

12. The non-transitory computer readable medium of claim 8, wherein the edge is a first edge of the media page,
wherein a width dimension of the first barcode image is parallel to the first edge, and the first barcode image abuts the first edge, and
wherein a height dimension of the first barcode image is parallel to a second edge and a third edge of the media page, and the first barcode image abuts the second edge and the third edge, the second and third edges being adjacent to the first edge.

13. The non-transitory computer readable medium of claim 8, wherein each pixel row of the plurality of pixel rows corresponds to a respective media page of a plurality of media pages to be included in a stack, and wherein for each respective pixel row and respective media page:
the respective pixel row is formed on a first edge of the respective media page;
the respective pixel row is stretched to generate a respective barcode image having a pixel row edge and opposing side edges adjacent to the pixel row edge, the pixel row edge having a width dimension equal to a width dimension of the digital image and equal to a width dimension of the first edge of the respective media page; and
the respective barcode image is formed on a face of the respective media page such that the pixel row edge of the respective barcode image overlaps the first edge of the respective media page and the side edges of the respective barcode image overlap second and third edges of the respective media page adjacent to the first edge.

14. An image forming system, comprising:
a processor; and
a non-transitory storage medium storing instructions executable on the processor to:
segment a digital image into a plurality of pixel rows, each pixel row of the plurality of pixel rows including plural pixels;
prior to printing the digital image, generate a first barcode image by stretching a first pixel row of the plurality of pixel rows from a first height to a second height greater than the first height; and
after the generating, cause printing of the digital image, the printing comprising depositing imaging material forming the generated first barcode image on a face of a media page at an edge such that the imaging material forming the generated first barcode image forms the first pixel row on the edge of the media page.

15. The system of claim 14, wherein each pixel row of the plurality of pixel rows corresponds to a respective media page of a plurality of media pages to be included in a stack, and wherein the instructions are executable on the processor to:
prior to printing the digital image, generate a second barcode image by stretching a second pixel row of the plurality of pixel rows from the first height to the second height,
wherein causing the printing of the digital image comprises depositing imaging material forming the generated second barcode image on a face of a second media page at an edge such that the imaging material forming the generated second barcode image forms the second pixel row on the edge of the second media page.

16. The system of claim 15, further comprising an assemble engine to cause the media pages to be assembled to form the stack such that the pixel row corresponding to each media page appears on the edge of that media page causing the digital image to appear on a side of the stack.

17. The system of claim 15, wherein each barcode image of the first and second barcode images has a width dimension equal to a width dimension of the digital image.

18. The system of claim 14, wherein the edge is a first edge of the media page,
wherein a width dimension of the first barcode image is parallel to the first edge, and the first barcode image abuts the first edge, and
wherein a height dimension of the first barcode image is parallel to a second edge of the media sheet, and the first barcode image abuts the second edge, the second edge being adjacent to the first edge.

19. The system of claim 17, wherein the edge is a first edge of the media page,
wherein a width dimension of the first barcode image is parallel to the first edge, and the first barcode image abuts the first edge, and
wherein a height dimension of the first barcode image is parallel to a second edge and a third edge of the media page and the barcode image abuts the second edge and the third edge, the second and third edges being adjacent to the first edge.

20. The system of claim 14 wherein each pixel row of the plurality of pixel rows corresponds to a respective media page of a plurality of media pages to be included in a stack;
wherein for each respective pixel row and respective media page:
the respective pixel row is formed on a first edge of the respective media page;
the respective pixel row is stretched to generate a respective barcode image having a pixel row edge and opposing side edges adjacent to the pixel row edge, the pixel row edge having a width dimension equal to a width dimension of the digital image and equal to a width dimension of the first edge of the respective media page; and
the respective barcode image is formed on a face of the respective media page such that the pixel row edge of the respective barcode image overlaps the first edge of the respective media page and the side edges of the respective barcode image overlaps second and third edges of the respective media page adjacent to the first edge;

the system further comprising an assemble engine to cause the plurality of media pages to be assembled to form the stack such that the barcode images combine to form the digital image on a first side of the stack and the side edges of the barcode images combine to form side barcode images on second and third sides of the stack.

* * * * *

UNITED STATES PATENT AND TRADEMARK OFFICE
CERTIFICATE OF CORRECTION

PATENT NO. : 10,289,874 B2  
APPLICATION NO. : 12/721341  
DATED : May 14, 2019  
INVENTOR(S) : Greg S. Smith Page 1 of 1

It is certified that error appears in the above-identified patent and that said Letters Patent is hereby corrected as shown below:

In the Drawings

In sheet 6 of 6, FIG. 09, reference numeral 68, Line 1, delete "EGE" and insert -- EDGE --, therefor.

Signed and Sealed this
Tenth Day of December, 2019

Andrei Iancu
*Director of the United States Patent and Trademark Office*